June 12, 1928.

J. S. STULL 1,672,964

CLUTCH

Filed Sept. 10, 1923

Inventor
John S. Stull
by H. A. Pattison
Atty.

Patented June 12, 1928.

1,672,964

UNITED STATES PATENT OFFICE.

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK.

CLUTCH.

Application filed September 10, 1923. Serial No. 661,762.

This invention relates to improvements in clutches and more particularly to that class thereof known as overload clutches.

An object of the invention is to provide an overload clutch which is readily adjustable to provide for varying loads thereon.

Another object of the invention is to provide an overload clutch which is simple in construction, is durable, and which operates with a minimum amount of friction when the clutch members are disengaged.

A clutch made in accordance with the invention may comprise driving and driven members with individually spring pressed balls carried by one member and engaging in suitable depressions formed in the other member to give the clutching effect. By the adjustment of a common collar mounted upon one member, the clutching action of the balls may be varied according to the load to be transmitted. Ball bearings are provided between the driving and driven members to reduce the friction therebetween when the clutch is disengaged and also to centralize the clutch members so that the clutching balls will be held in correct alignment with the depressions.

These and other objects of the invention not specifically mentioned will clearly appear from the following description and the accompanying drawings, Fig. 1 of which shows a view partly in section of a clutch embodying the invention and mounted on a tapping machine (partially shown);

Figs. 2 and 3 are sections taken on the lines 2—2 and 3—3 respectively of Fig. 1, looking in the directions indicated by the arrows, Fig. 3 being somewhat reduced; and Fig. 4 is a view in end elevation of the clutch looking toward the left of Fig. 1 with the means for determining the safe load and the proper adjustment of an overload clutch mounted in position thereon.

In the drawings in which the invention is shown in connection with a screw tapping machine of any well known type, the numeral 10 designates a driving spindle. Suitably mounted upon the spindle 10 is a driving member 12 of the improved clutch, which is in axial alignment with the driven member or chuck holder 13. A chuck 14 of a well known type may be mounted on an arbor 15 integral with the driven member 13, and a screw tap 17 (partially shown) may be clamped between the usual chuck jaws 18 operated in the ordinary manner by rotating in an opening 19 a suitable key (not shown), having teeth cooperating with teeth 20 controlling the jaws. Carried in openings 21 in the driving member 12 are a plurality of balls 22, preferably of steel, which rest in suitable depressions 23 formed in the driven member 13. Each of the balls 22 is yieldably held by a compression spring 24, placed between the ball and a pin 25, the outer end of which is rounded and rests in a suitable depression 27 formed in a knurled collar 30 which is screw threaded onto one end of the driving member 12. By turning the collar 30 on the driving member 12, the tension of the springs 24 may be varied to regulate the pressure exerted thereby, according to the releasing load of the clutch. The greater the tension placed on the springs, the greater the load the clutch will carry without releasing. A plurality of equally spaced depressions 27, which are greater in number than the pins 25, are provided in the collar 30 so that the tension put on the spring may be delicately adjusted to suit the size of the tap carried in the chuck 14, or in the case of a drilling machine, to the size of the drill being used. The depressions engaging the pins 25 also serve to retain the collar in its adjusted position.

The driven member 13 comprises a disklike member 32 carrying the arbor 15 on its outer face with a central depression 33 formed on its inner face. A shouldered end 34 of the driving member 12 projects into the depression 33 to form a race for retaining balls 36 forming a bearing, which functions not only to reduce the friction between the driven and driving members when the clutch is released, but also to properly position the members and to align the balls 22 with the depressions 23. Screw threaded onto the peripheral surface of the disk 32 is a collar 37 which is fixed in position thereon by a set screw 38. A projecting circular flange 39 formed on the driving member 12, inside of the collar 37, cooperates with an inturned flange on such collar to form a race for a second set of balls 40. The purpose of the second set of balls 40 is the same as for the first set 36. No relative movement between the balls 22, 36 and 40, and the surfaces they engage, occurs while the members of the clutch are engaged.

In operation, when the amount of power required to drive the chuck 14 exceeds the pressure exerted by the springs 24, the driving and driven members will cease to rotate together as a unit and the driven member 13 will stand still, the balls 22 leaving the depressions 23 formed therein and moving upon the surface thereof. At this time the balls 36 and 40 will immediately begin to rotate and thus the clutch members will be instantaneously released. The balls 36 and 40 function to reduce the friction between the parts and consequently the wear thereon.

Whenever a different size of tap or drill is to be used in the chuck, the tension of the springs is changed by merely turning the collar 30 by hand in one direction or the other, until the tension of the springs is sufficient to cause the two members of the clutch to rotate as a unit and carry the load required. Since the number of depressions 27 in the collar 30 is in excess of the number of pins 25 and are very closely spaced, it is evident that very minute adjustments of the tension of the springs 24 may be obtained. Thus a particular set of springs may be adjusted for a plurality of sizes of taps or drills.

Furthermore, by replacing one set of springs by springs adapted to exert a different pressure, another range of loads will be provided for. The change of springs may be made without the use of tools by merely unscrewing the knurled collar 30, removing the pins 23, and springs 24, inserting another set of springs and reassembling.

To readily determine the correct pressure that the springs 24 should exert upon the balls 22 to prevent an undue strain or breaking of a certain size tap, a lever arm 45 is provided, having at one end a portion 46 bent at right angles and which may be secured in the jaws 18 of the chuck 14 in the same manner as the tap 17. (See Fig. 4.) A plurality of notches 47 suitably spaced and numbered as indicated at 48 for a certain range of sizes of taps are formed in the top surface of the lever arm 45 and a weight 49 supported by a strap 50 may be suspended from any of the notches. In the use of the lever arm 45 and weight 49, to arrive at the correct tension for the springs 24 for a certain size tap, the collar 30 is rotated on the driving member 12 to compress the springs 24 until the tension is great enough to hold the lever arm 45 in a horizontal position, as shown in the drawing, with the strap 50 positioned in the notch marked with the number corresponding to the tap to be used in the chuck. Thereafter the collar 30 is gradually turned in the reverse direction to lessen the tension of the springs 24, and when the lever arm moves from the horizontal position shown, due to the weight 49 carried thereby, it is an indication that the adjustment of the tension in the springs 24 is correct for the particular tap to be used or load to be carried, and that the clutch while operating will be automatically released when the resistance encountered by the tap or the driven member exceeds the predetermined amount for which the springs have been adjusted.

What is claimed is:

1. An overload clutch comprising a driven member having a plurality of clutch depressions, a driving member, yieldable devices carried thereby and engaging the clutch depressions to form a driving connection between said members, said devices yielding in response to a load in excess of a predetermined amount to cause a release of the clutch, friction reduction balls mounted between said members, centralizing said clutch members to align said devices with the clutch depressions, and to reduce the friction between the clutch members when the clutch is released.

2. An overload clutch comprising driving and driven members, a plurality of yieldable devices forming a driving connection interposed therebetween and yielding in response to a load in excess of a predetermined amount, and a collar adjustably mounted upon the driving member for simultaneously varying the yieldability of all of said devices, said collar being provided with a plurality of depressions engaging one end of the yieldable devices for retaining the collar in its adjusted position and adjusting the yieldability of said devices.

3. An overload clutch comprising driving and driven members, a plurality of yieldable devices forming a driving connection interposed therebetween and yielding in response to a load in excess of a predetermined amount, and a collar engaging said yieldable devices and adjustably mounted upon the driving member for simultaneously varying the yieldability of all of said devices, said collar being provided with depressions, the number of which is in excess of the number of said yieldable devices, for graduating the adjustment of said yieldable devices.

4. An overload clutch comprising a driven member having a plurality of longitudinal openings therethrough, a pin and a ball in each opening, a resilient member positioned therebetween and normally urging them apart, a driven member having a plurality of depressions for receiving the balls and corresponding in number thereto, and a cup-shaped collar threaded upon the opposite end of the driving member and having a plurality of depressions greater in number than the openings to receive the ends of the pins for varying the effectiveness of the resilient members in establishing a driving connection between the driving and driven members.

In witness whereof, I hereunto subscribe my name this 29th day of August, A. D., 1923.

JOHN STANLEY STULL.